UNITED STATES PATENT OFFICE.

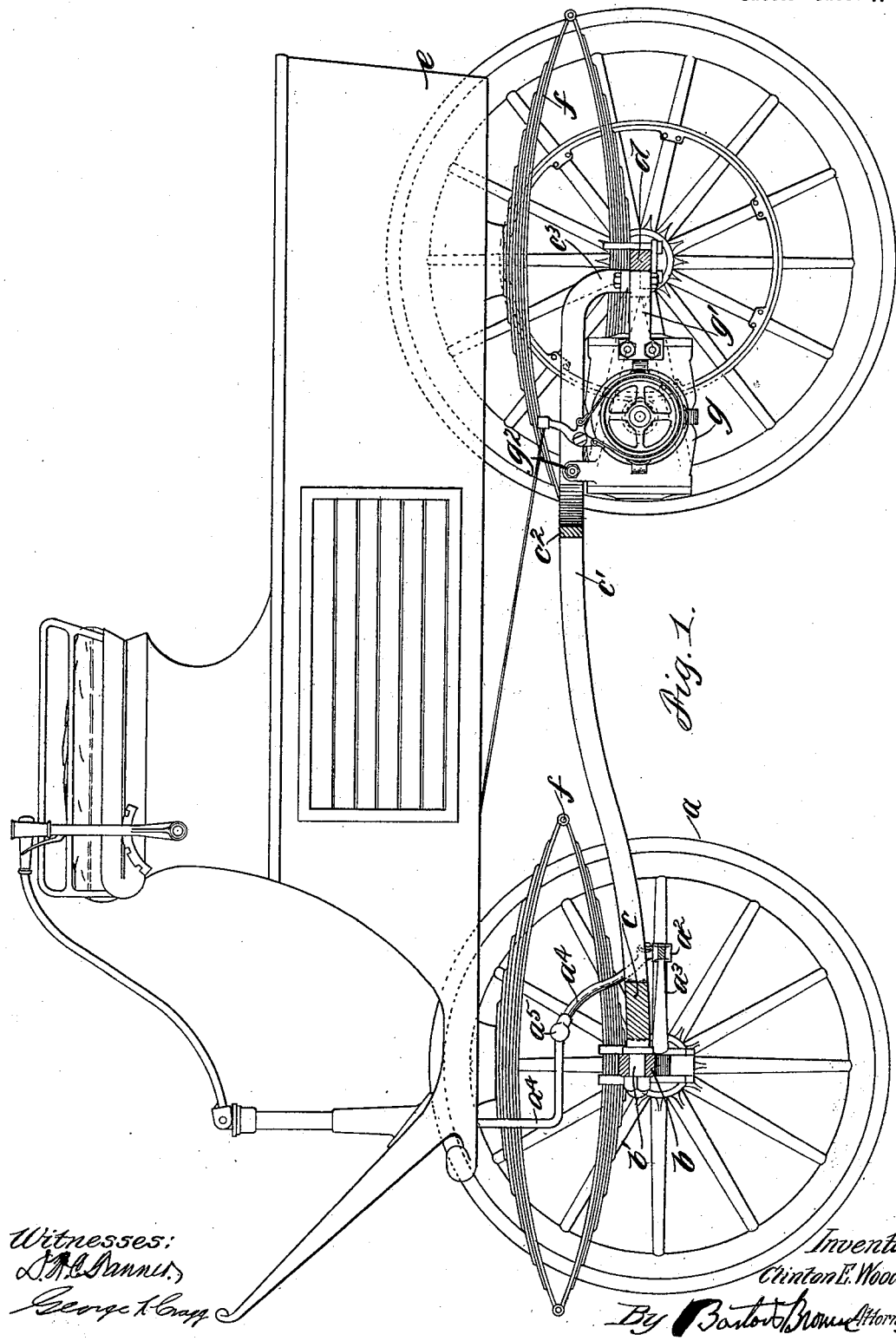

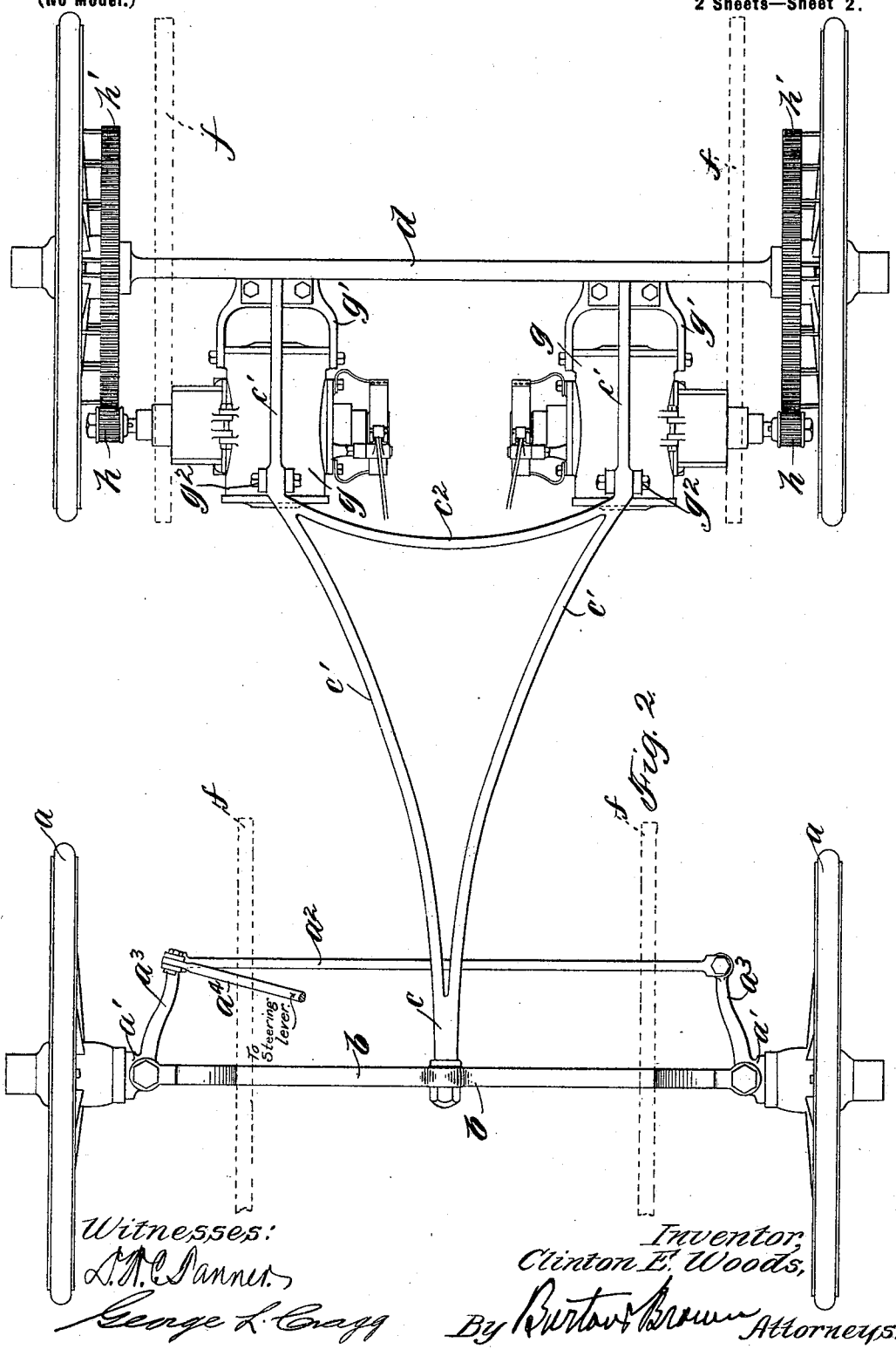

CLINTON E. WOODS, OF CHICAGO, ILLINOIS.

VEHICLE.

SPECIFICATION forming part of Letters Patent No. 648,014, dated April 24, 1900.

Application filed October 10, 1898. Serial No. 693,086. (No model.)

*To all whom it may concern:*

Be it known that I, CLINTON EDGAR WOODS, a citizen of the United States, residing at Chicago, in the county of Cook and State of Illinois, have invented a certain new and useful Improvement in Vehicles, (Case No. 7,) of which the following is a full, clear, concise, and exact description.

My invention relates to vehicles, and has for its object the improvement of the running-gear entering into the construction thereof and the mounting of vehicle-bodies upon their running-gears.

My invention was primarily designed for improving the construction of motor-vehicles in the respects above set forth, and is especially well adapted to that class of motor-vehicles employing electric motors; but I do not wish to be limited in the use of my invention to motor-driven vehicles.

By means of my invention I am enabled greatly to simplify the construction of vehicles and their running-gears and greatly to reduce the weight of the component parts of running-gears, which, especially in motor-vehicles, is a great desideratum.

In one embodiment of my invention I have employed a perch or wagon-coupling uniting the front and rear axles, one of the axles, preferably the front axle, being pivoted upon the perch to swing in a vertical plane, the adjacent portion of the perch where the axle is pivoted being located in the same horizontal plane with the pivotal axis. The pivoted axle supports at its ends extensions, upon which vehicle-wheels are mounted, the said extensions being pivoted to the said axle. In vehicles employing motors for their propulsion the extensions of the pivoted shaft are coupled, a steering-lever being connected with the coupling, which may be operated to direct the wheels in the selected line of travel. In order to counteract the tendency of the front axle to swing in a horizontal plane, I unite the same with the rear axle, preferably by vertically-yielding connections located upon both sides of the pivot. In the preferred embodiment of my invention I interpose springs or cushions between the wagon-body and the axles, the springs and wagon-body serving as the means of connection between the axles. By placing the pivot in the plane of the contiguous portion of the perch I am enabled greatly to reduce the rotary effort exerted thereupon when the vehicle encounters unusual obstacles, ruts, or heavy grades.

I am aware that it is old to interpose perches between the axles of vehicles and to mount one of said axles upon said perch to rotate in a vertical plane. Such structures have heretofore been employed with the pivot considerably removed from the plane of the adjacent portion of the perch, thus subjecting the parts to great strain, which by my construction I am enabled to avoid. With the vehicles of the prior art it was necessary to provide crab-jaws or similar devices carried by the perch for engaging the pivoted axle to prevent the axle from being injured by the strains to which it is frequently subjected in the travel of the vehicle. By means of my invention I am enabled to dispense with such auxiliary devices and am enabled to simplify the construction of the perch itself. As to the prior state of the art, reference may be had to Patent No. 594,805, issued to H. P. Maxim November 30, 1897.

I will explain my invention more particularly by reference to the accompanying drawings, which illustrate the preferred embodiment thereof.

Figure 1 is a side elevation of a motor-vehicle constructed in accordance with my invention, parts being shown in section to reveal more clearly the nature of the construction. Fig. 2 is a plan view of the running-gear entering into the construction of the vehicle shown in Fig. 1.

Like letters indicate like parts in both views.

In this particular instance the front wheels $a\ a$ are supported by the pivoted axle $b$, the wheels being mounted upon extensions $a'\ a'$ of said axle, said extensions being pivoted upon the ends of the axle. The link $a^2$ connects the arms $a^3\ a^3$, projecting from the extensions. A steering-lever $a^4$ is connected with the extensions, as shown. A ball-and-socket joint $a^5$ is interposed in the length of the steering-lever. As the steering-lever is of well-known construction, I will not further describe the same.

A perch $c$ is interposed between the front axle $b$ and the rear non-rotatable axle $d$. The side members $c'$ $c'$ are bolted to the rear axle. These side members are extended toward the front axle and are there joined directly together to form a support for the horizontal pivot $b'$, upon which the axle $b$ is journaled to rotate in a vertical plane, the pivot being practically a continuation of the side members and disposed in the same plane therewith. I interpose between the side members for the purpose of strength and rigidity a curved bracing member $c^2$. To maintain the front and rear axles in their proper relative position and to prevent the pivoted axle from being affected by strains exerted thereon, I preferably connect the axles by the vehicle-body $e$, vehicle-springs $f$ $f$, which may be of usual construction, being interposed between the vehicle-body and axles and directly attached thereto. The vehicle-body may serve as a medium of connection between the axles without supporting the same directly upon the rear axle.

Where my invention is employed in the construction of motor-vehicles, I preferably extend the rear portion of the perch $c$ upwardly and unite the same with the rear axle by means of downward extensions $c^3$, so that the centers of rotation of the motors $g$ $g$ and the axis of rotation of the rear wheels may lie in a plane practically parallel with the roadway. I preferably rigidly mount the motors by coupling each at one end to the rear shaft at $g'$ and at the other end to the perch at $g^2$. Each motor is provided with a pinion $h$, engaging a gear $h'$, mounted upon the rear shaft. The wagon-body and the springs uniting the same with the front and rear axles form a union or auxiliary coupling between said axles, which is adapted to yield in a vertical or perpendicular direction to permit the pivoted axle to swing in a vertical plane or a plane perpendicular to the roadway, said union being practically unyielding lengthwise, whereby the two axles are effectually braced and maintained apart. By the construction herein shown the front axle is capable of swinging to a limited extent in a substantially-vertical plane, whereby the wheels of the vehicle readily adapt themselves to inequalities in the roadway. Strains to which the running-gear is subjected are by means of my improved construction borne by the entire perch and connected parts instead of a limited portion of the running-gear. By means of the construction shown the operating-motors are rigidly supported in position with relation to the perch and rear axle.

While I have shown and particularly described one embodiment of my invention, I do not wish to be limited thereto, as changes may readily be made by those skilled in the art without departing from the spirit of my invention; but,

Having thus described my invention, I claim as new, and desire to secure by Letters Patent, the following:

1. In a running-gear for motor-vehicles, the combination with a perch having side members $c'$ $c'$ which converge at one end, of an axle $b$ pivotally mounted upon the converged ends of said perch members, the pivotal axis being located in the same horizontal plane with the portion of the perch contiguous to said axle, the diverging portions of said perch members being curved upwardly and provided with downward extensions $c^3$ $c^3$, a second non-rotatable axle $d$ rigidly united with said extensions, vehicle-wheels upon axle $d$, motors $g$ $g$ fixedly attached to the axle $d$ and to the perch members $c'$ $c'$, and gearing interposed between said motors and the wheels upon axle $d$, substantially as described.

2. In a vehicle, the combination with a perch having side members $c'$ $c'$ which converge at one end, of an axle $b$ pivotally mounted upon the converged ends of the members $c'$ $c'$ to swing in a plane substantially perpendicular to the roadway, a second non-rotatable axle $d$ rigidly secured to the perch at the diverged ends of the members $c'$ $c'$, a vehicle-body, a spring-mounting interposed between the vehicle-body and the pivoted axle and serving to support the body directly upon the pivoted axle independently of the perch, and a spring-mounting interposed between the remaining non-rotatable axle and the vehicle-body, substantially as described.

In witness whereof I hereunto subscribe my name this 4th day of October, A. D. 1898.

CLINTON E. WOODS.

Witnesses:
A. L. LAWRENCE,
GEORGE L. CRAGG.